April 29, 1924.
A. SMALL
BEDPAN
Filed May 25, 1923
1,492,109
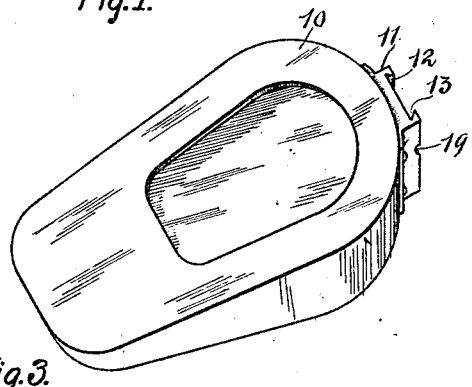
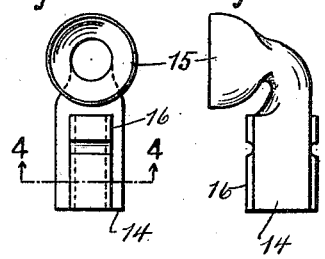 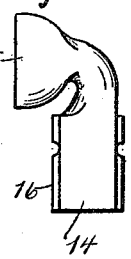
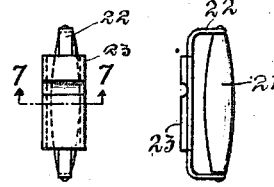 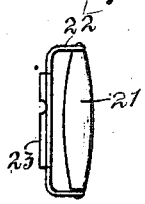
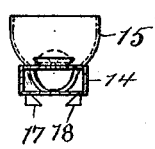
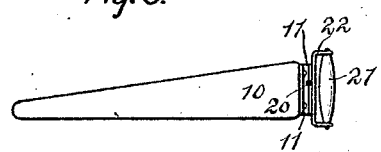
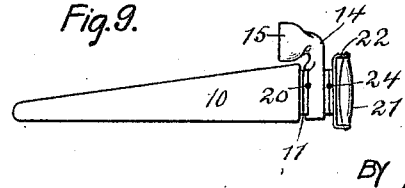
INVENTOR
Adina Small
BY
ATTORNEY Patented Apr. 29, 1924.

1,492,109

UNITED STATES PATENT OFFICE.

ADINA SMALL, OF NEW YORK, N. Y.

BEDPAN.

Application filed May 25, 1923. Serial No. 641,354.

*To all whom it may concern:*

Be it known that I, ADINA SMALL, a citizen of the United States, and resident of the borough of Manhattan, city of New York, county of New York, State of New York, have invented certain new and useful Improvements in Bedpans, of which the following is the specification.

The object of this invention is to provide a bed-pan that can be more readily handled than the ordinary pan and that will have as a removable part thereof a urinal.

Another object of the invention is to provide a handle that may be detached when desired, but which cannot be detached accidentally.

With these objects in view, I have constructed the device which I will now describe and the accompanying drawing should be referred to for a complete understanding of the specification which follows:

In the drawing:

Fig. 1 shows the bed-pan without attachments.

Fig. 2 is a front elevation of the urinal.

Fig. 3 a side elevation thereof.

Fig. 4 a sectional view thereof.

Fig. 5 is a front elevation of the handle.

Fig. 6 a side elevation thereof.

Fig. 7 a sectional view thereof.

Fig. 8 is a side elevation of my device with the handle attached.

Fig. 9 is a side elevation of my device with both the handle and urinal attached.

Similar reference numerals indicate like parts in all the figures where they appear.

At 10, I show a bed-pan which may be of any ordinary shape and size. Secured to the front of the body of the pan is a block or casting 11 having ways 12 and 13 formed therein for the reception of members which I am about to describe.

I have found it desirable, particularly with male patients to provide an independent urinal such as is shown in detail in Figs. 2, 3 and 4. This member consists of a body or receptacle 14 with an enlarged mouth 15 formed integral therewith. Upon one side of this member I arrange guides 16 adapted to be received into the ways 12 and 13 and upon the other side of the body 14 I arrange ways 17 and 18.

A perforation 19 formed partly in the block 11 and guide 16 is adapted to receive a pin 20 to prevent the receptacle 14 being accidentally withdrawn from the guides.

I provide a handle 21 having a bracket 22 upon which is arranged a guide 23 adapted to be received into pairs of ways 12 and 13 or 17 and 18 and to be retained therein by pins 20 or 24.

As shown in Fig. 8, the handle member may be secured directly to the pan 10 or as shown in Fig. 9, the urinal 14 may first be placed in position and the handle secured and supported by the urinal, making an integral whole.

The handle or the urinal member may be differently shaped and other modifications may be made within the scope of the appended claims without departing from the principle or sacrificing the advantages of the invention.

Having carefully and fully described my invention what I claim is:

1. A bed-pan, a receptacle adapted to be secured thereto, a handle adapted to be secured to said receptacle and means for preventing the inadvertent release of said handle or said receptacle.

2. A bed-pan provided with a plurality of ways, a receptacle adapted to be received in said ways and means for securing said receptacle in said ways.

3. A bed-pan having a plurality of ways, a receptacle having a projection adapted to be received in said ways and means engaging said ways and said projections for preventing the removal of said receptacle.

4. A bed-pan having a plurality of ways and a handle member having a projection adapted to be received in said ways and means for temporarily retaining said projection in said ways.

5. A bed-pan having a plurality of ways, a receptacle having a projection adapted to be received in said ways and a plurality of ways and a handle having a projection adapted to be received in the ways on said receptacle and means for retaining all said members in operative position for the purpose set forth.

Signed at the city, county and State of New York, this 7 day of May, 1923.

ADINA SMALL.